United States Patent [19]

Duff

[11] 4,194,228

[45] Mar. 18, 1980

[54] MAGNETIC DISC HOUSING WITH MEANS TO PREVENT RADIAL DISC SHIFT

[75] Inventor: James A. Duff, Omaha, Nebr.

[73] Assignee: Magnetic Peripherals Inc., Minneapolis, Minn.

[21] Appl. No.: 950,346

[22] Filed: Oct. 11, 1978

[51] Int. Cl.² .................... G11B 23/02; B65D 85/30
[52] U.S. Cl. .................................. 360/133; 206/444
[58] Field of Search ..................... 360/133; 206/444

[56] References Cited

U.S. PATENT DOCUMENTS

| | | | |
|---|---|---|---|
| 3,524,540 | 8/1970 | Brown et al. | 360/133 |
| 4,071,862 | 1/1978 | Lathrop et al. | 206/444 |

*Primary Examiner*—Robert S. Tupper

*Attorney, Agent, or Firm*—Edward L. Schwarz

[57] ABSTRACT

In a disk memory module of the type having a permanent housing enclosing the disk and hub, and an opening at the bottom to allow access to the hub by the spindle of the drive unit on which the module is mounted, an improvement for restricting radial movement of the disk and hub within the housing to prevent damage to the disk caused by contact between it and the housing. An annular projection on the interior top surface of the housing fits inside an annular depression in the top of the hub. Radial movement of the hub causes contact between the projection and the side of the depression before the disk edge strikes the inside edge of the housing.

5 Claims, 4 Drawing Figures

MAGNETIC DISC HOUSING WITH MEANS TO PREVENT RADIAL DISC SHIFT

BACKGROUND OF THE INVENTION

In one popular kind of disk memory module, a permanent housing encloses the disk assembly (which comprises the disk itself, the hub which is mounted on and rotated by the drive unit spindle, and means for fastening the disk to the hub). An opening in the bottom of the housing allows access to the hub by the drive unit spindle. During use the disk assembly is supported by the spindle, but the housing must provide the support when the module is not mounted on the drive unit. What is important is that the disk itself not be allowed to touch the inside of the housing at any time, because damage to the recording surface may occur. This may result in loss of information and possibly catastrophic "crashing" of the disk, ruining the transducing head as well.

When the module is dismounted from the drive unit, the disk assembly is axially clamped in some fashion by a mechanism associated with the closing of an access port (e.g. U.S. Pat. No. 4,084,200) or with a dust shield attached to the bottom of the module housing. The force produced by clamping the disk assembly thusly is not great enough however, to prevent radial shifting of the disk assembly during rough handling. To prevent excessive radial shifting in this case, as well as when the assembly is loose within the housing, a typical solution has been to place cylindrical projections at spaced intervals about the periphery of the hub adjacent the spindle access opening. This has not been totally successful for several reasons. Since a relatively small amount of contact area is involved relative to the mass of the hub assembly and the low area and strength of the (usually plastic) projections, they are liable to deformation and wear over a period of time. In the cases where the dust shield attaches to the bottom of the permanent housing to clamp the hub against the upper interior surface of the permanent housing, areas of the projections which restrain radial movement of a disk assembly are even smaller.

BRIEF DESCRIPTION OF THE INVENTION

To solve these problems, I have designed a different type of disk movement restricting apparatus. An annular projection is affixed approximately concentrically to the inside upper surface of the housing. The upper surface of the hub contains a concentric annular depression having walls substantially parallel with respect to the axis of the disk. The projection is long enough to extend into the depression a distance sufficient to prevent the excessive radial movement of the hub without projection wear, even when the hub is resting on the bottom of the housing.

Accordingly, one purpose of this invention is to provide a large area of contact between the hub of a disk assembly and the structure in the housing restraining its radial movement.

Another purpose is to locate such movement-restraining structure on the side of the hub opposite that to which the drive unit spindle attaches.

Yet another purpose is to provide such a restraint fully operable regardless of the axial position of the hub within the housing.

Other purposes and aims of this invention become apparent in the description which follows.

DESCRIPTION OF THE PREFERRED EMBODIMENT

Figure 1:
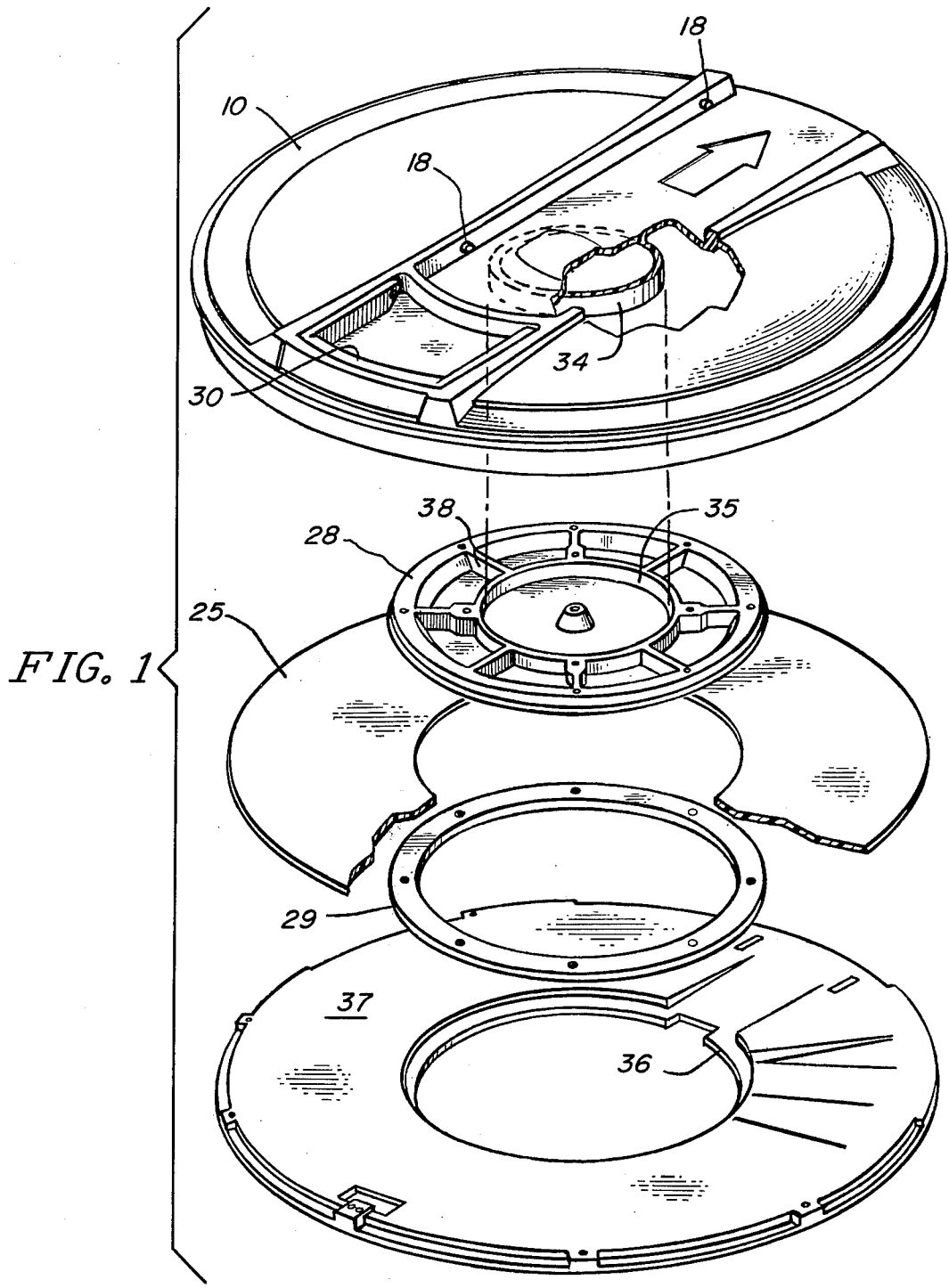
FIG. 1 is an exploded view of a disk module employing this invention.
Figure 2:
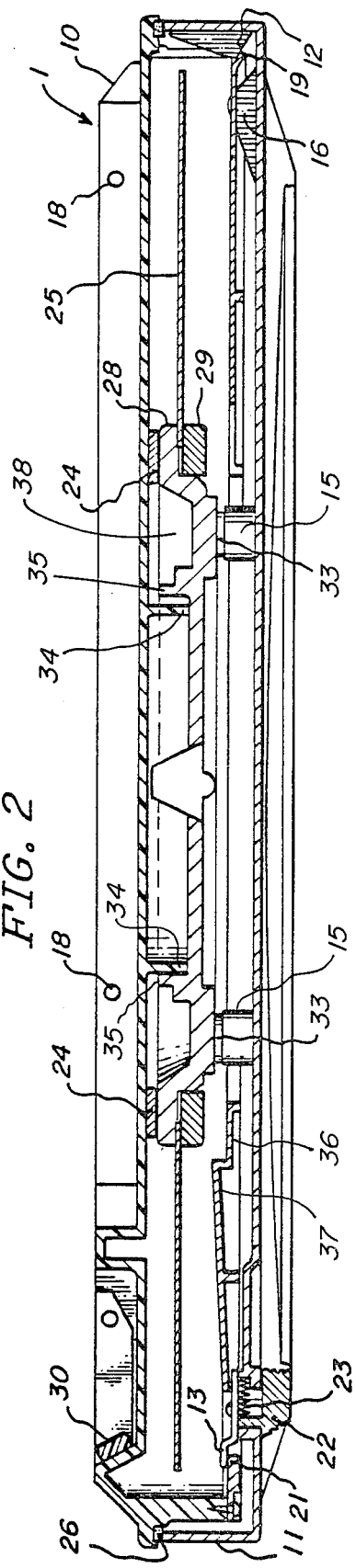
FIG. 2 is a side cross section view of such a module with its bottom dust shield attached, showing the relationship between the elements of the invention with the bottom dust shield attached to the module housing.

To first describe the environment in which this invention functions, it is useful to describe the disk module employing it. In FIG. 1, disk 25 is clamped to hub 28 by bolts passing through holes in clamping ring 29. This assembly is carried within housing 1 (FIG. 2), which comprises an upper section 10 and lower portion 37 fastened to it with screws. Housing 1 is supported and transported within the drive unit by pins 18. In FIG. 2, bottom dust shield 11 is attached to housing 1 on the right side by projection 12 which rests on lip 19, and on the left side by latch 13 which rests on striker 21. Attaching dust shield 11 to housing 1 compresses gasket 26 and seals the interface between the shield and housing. Dust shield 11 is removed by pushing thumb button 22 to the right against spring 23 releasing latch 13 from striker 21. When the dust shield is attached to housing 1, as shown in FIG. 2, resilient pads 33 fixed to 28 against pads 24 on the underside of the top of housing 1. This immobilizes hub 28 in the axial direction and creates frictional resistance to radial movement. The frictional resistance isn't great enough to reliably restrict hub 28 to near the center of housing 1, and of course, when shield 11 is detached (FIG. 4) furnishes no opposition at all to radial shifting of hub 28.

Annular projection 34, concentrically located on the bot fits within annular depression defined by wall 35 on the top of hub 28. Both the exterior side of projection 34 and wall 35 of the depression are substantially parallel to the axis of rotation of disk 28. They nestingly mate at all times and prevent radial movement of hub 28 and disk 25 above a predetermined amount, thereby preventing contact of the interior side surfaces of housing 1 by disk 25. When dust shield 11 is attached to housing 1, projection 34 very nearly contacts the bottom of depression 35, as shown in FIG. 2. The clearance at the right-hand side between projection 34 and wall 35 shows the amount of radial movement permitted hub 28.

Figure 3:
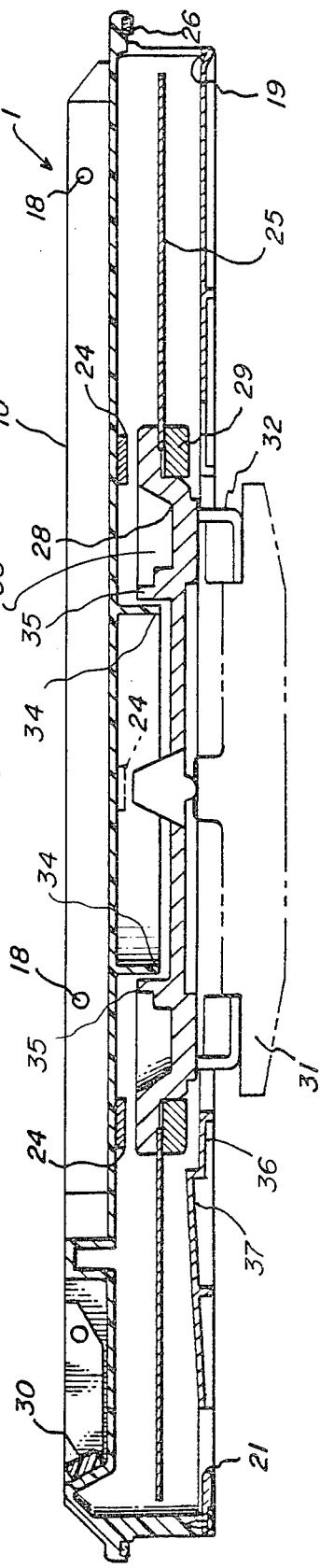
FIG. 3 is a side cross section view of the disk module when mounted on drive unit spindle, and shows the relationship between the elements of the invention in this situation.
Figure 4:
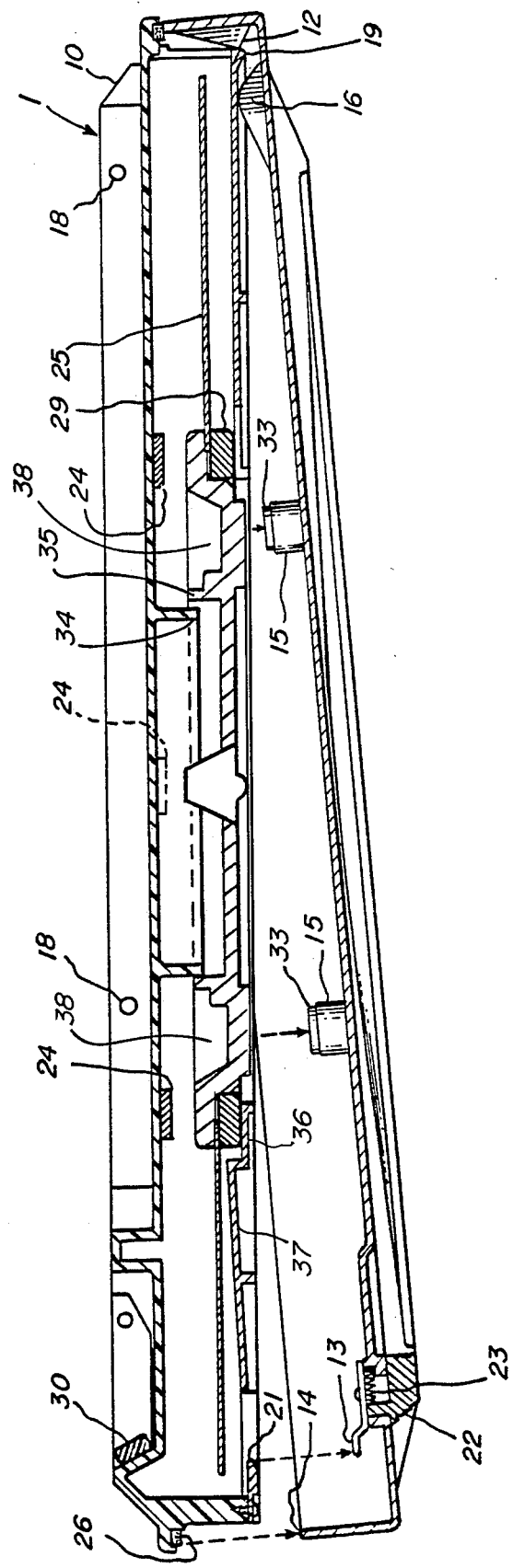
FIG. 4 is a side section of a disk module employing this invention, with the bottom dust shield detached, and showing the relationship between the elements of the invention in this situation.

In FIG. 3, hub 28 is attached to drive unit spindle 31 by magnet 32. In this position clearance is present on both sides between projection 34 and depression 35 to prevent rubbing between them while spindle 31 is rotating hub 28. Housing 1 is supported by the drive unit to achieve this. In FIG. 4 with dust shields 11 detached, clamping plate 29 lies on horizontal surface 36 of the bottom element 37. Projection 34 is long enough to extend sufficiently (in one design about 2.5 mm.) into depression 35 to continue to restrain radial movement of hub 28 greater than the predetermined amount.

With the radial movement restraints at the top of hub 28, projection 34 extends the greatest amount into depression 35 when dust shield 11 is attached. This is the preferred condition because the module is likely to be subjected to its roughest handling while shield 11 is attached. This is true for two reasons. First, dust shield 11 is intended to be attached to the module at all times except when it is mounted on the drive unit. Spindle 31 supports hub 28, preventing radial movement, when module is mounted in the drive unit. So there is only a very brief time between detaching of shield 11 and mounting the module on the drive unit (or dismounting from the drive unit and reattaching shield 11) that hub 28 is loose and projection 34 does not extend almost all the way to the bottom of depression 35. Secondly, during this time the module will normally be handled by trained operators who are relatively unlikely to physically abuse it. If the depression faced downwardly and the projection faced upwardly into the depression from the bottom of housing 1, when shield 11 was attached the minimum amount of overlap between the depression and the projection would exist. Accordingly, one could expect physical abuse to eventually cause damage to occur to one or the other.

The interfering surfaces restraining annular movement are as shown, preferably outside on the fixed top element 10 and inside on rotating hub 28, because ribs 38 make this design more convenient. However, a different design employing ribs near the axis of hub 28 only could reverse the position of the interfering surfaces of projection 34 and wall 35. Upper section 10 also could be designed to carry the depression and hub 28 the projection, but this would require a larger vertical size of the module, not a favored situation.

What is claimed is:

1. In a disk memory module of the type having a permanent substantially circular housing enclosing the disk, said disk supported by a hub having a central drive unit spindle attachment area and a peripheral downwardly facing support area, said housing having an opening in the bottom allowing access to the spindle attachment area of the drive unit spindle and supporting around its edge the hub on its peripheral support area in a predetermined axial position, an improvement for preventing radial shifting of the hub past a predetermined deviation from concentricity with the housing, comprising
   (a) an annular projection of predetermined height fixed to and extending downwardly from the interior surface of the top of the housing and substantially concentrically located thereon; and
   (b) an area on the hub portion facing the annular projection having an annular depression into which the annular projection extends a predetermined distance with predetermined axial and radial tolerances therebetween while the hub's peripheral support area is supported by the edge of the housing bottom opening, said predetermined radial tolerance equaling the predetermined deviation from concentricity.

2. The improvement of claim 1, wherein the annular projection comprises a ring.

3. The improvement of claim 2 wherein the annular depression comprises an annular cylinder into which the annular ring extends.

4. The improvement of claim 2, wherein the exterior side of the ring is substantially parallel to the axis of the disk.

5. The improvement of claim 3, wherein the annular cylinder comprising the depression has an interior wall substantially parallel to the axis of the disk.

* * * * *